Patented Dec. 1, 1931

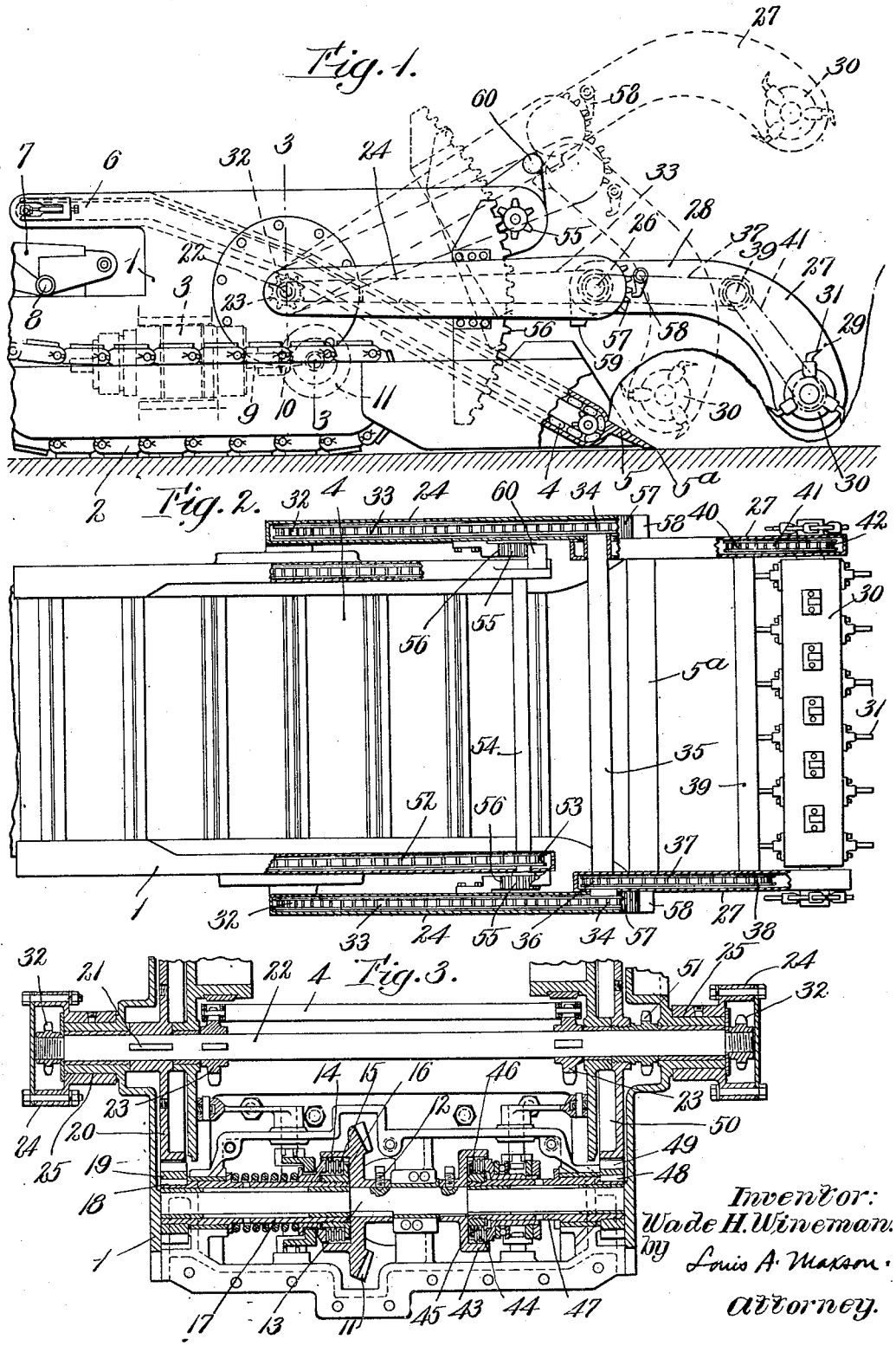

1,834,584

UNITED STATES PATENT OFFICE

WADE H. WINEMAN, OF MICHIGAN CITY, INDIANA, ASSIGNOR TO SULLIVAN MACHINERY COMPANY, A CORPORATION OF MASSACHUSETTS

LOADING MACHINE

Application filed September 3, 1926. Serial No. 133,496.

This invention relates to loading machines and more particularly to machines for gathering and conveying loose material as for instance broken coal.

An object of this invention is to provide an improved loading machine having improved and simplified mechanism for gathering or raking the loose material onto the conveyor. Another object of this invention is to provide improved mechanism that will efficiently pull down or rake broken coal or similar loose material toward and onto cooperating conveying means, the purpose being to materially increase the capacity of the loading machine by providing a construction capable of moving a comparatively large amount of material at each cycle of operation. A still further object of this invention is to increase the speed at which the material is handled and to provide for greater advance of the machine at each step thereof toward the material being handled. Yet another object of this invention is to provide a loading machine having improved gathering mechanism including a rotary toothed roller or rake which sweeps the coal down and draws it up onto the conveyor far enough in advance of the machine to enable the loading machine to move forwardly a comparatively great distance at each cycle of operation. These and other objects and advantages of my invention will however hereinafter more fully appear.

The invention accordingly resides in the novel organization, details of construction, parts or equivalents thereof hereinafter more fully described and then defined in the appended claims.

In the accompanying drawings I have shown one illustrative form which my invention may assume in practice.

In these drawings,—

Fig. 1 is a side elevational view of the forward end of a loading machine incorporating the improved gathering or raking means, the rotary gathering means being shown in a plurality of positions as indicated by dotted lines.

Fig. 2 is a plan view of the loading machine shown in Fig. 1, parts being broken away in section to illustrate details of construction.

Fig. 3 is a transverse vertical sectional view taken substantially on line 3—3 of Fig. 1.

In this illustrative embodiment of my invention I have shown a loading machine comprising a generally rectangular body or frame 1 mounted on endless tracklaying treads 2 of usual form, the latter being driven through any suitable connections from a motor 3 carried by the frame 1. The machine body or frame 1 carries an upwardly inclined endless conveyor 4, the lower end of which is clearly shown in Fig. 1. The conveyor 4 has a receiving end in the form of a shovel or scoop 5 having a horizontal transversely extending edge $5^a$. The rear end 6 of this conveyor overhangs the receiving end of an endless conveyor 7 which is swiveled in a suitable manner on the rear end of the frame 1 to swing laterally in either direction relative to the conveyor 4. The endless conveyor 7 is pivoted as at 8 for vertical adjustment. It will be understood that the endless tracklaying treads 2 and the endless conveyor 7 are driven from the motor 3 through suitable mechanism which will not be described herein as the structure referred to forms no part of the present invention except as it cooperates therewith.

In specifically describing the mechanism for driving the endless conveyor 4 it will herein be observed that the forward end of the horizontal, longitudinally extending armature shaft 9 of the motor 3 has suitably secured thereto at its forward end a bevel pinion 10 which meshes with a larger bevel gear 11 (see Fig. 3) secured as by a set screw 12 to the horizontal shaft 13 extending transversely of the frame 1 and journaled thereon in a suitable manner. As shown, carried within the bevel gear 11 is a series of friction clutch disks 14 which are interleaved with a corresponding series of clutch disks 15 carried by a clutch member 16 threadedly connected to a sleeve 17 supported on and surrounding the shaft 13. Secured to the outer end of this sleeve 17 as by a key 18 is a spur pinion 19 which meshes with a larger spur gear 20 keyed as at 21 to a shaft 22 disposed above and slightly in the rear of the shaft 13, the shaft 22 being disposed parallel with the shaft 13, and journaled in a suitable manner within the machine frame. Secured to the shaft 22 adjacent each end thereof are sprockets 23 with which the endless side chains of the conveyor 4 cooperate.

In order to feed loose material onto the receiving end 5 of the conveyor 4 there is provided on each side of the machine a supporting member or arm 24. These arms 24 are pivoted to the machine body on a horizontal transversely extending axis as at 25 and extend forwardly and are pivotally connected, as at 26, to cooperating parallel arms 27, the latter extending forwardly to a point beyond the horizontal edge 5ᵃ of the receiving end of the conveyor 4. As clearly shown in Fig. 1, the arms 27 are formed with radially extending portions 28 and with downwardly offset or depressed portions 29 extending outwardly in a direction in the same vertical plane with the portions 28. The portions 29 of the arms 27 have journaled thereon a rotary gathering drum or feeding rake 30 having radially projecting teeth 31. This rotary gathering member extends transversely of the receiving end of the conveyor and is preferably arranged on an axis extending completely across the machine.

In specifically describing the improved driving connections for the rotary gathering member 30 it will be observed that secured to the shaft 22 (see Fig. 3) at the ends thereof, are chain drive sprockets 32 which are connected by means of endless chain connections 33 to sprockets 34 secured at each end of a horizontal transversely extending shaft 35, this shaft also forming the pivot 26 for the parallel supporting arms 27. As shown in Fig. 2, also secured to the shaft 35 adjacent one of the sprockets 34 is a drive sprocket 36 which is connected by means of an endless chain connection 37 with a sprocket 38 secured to a shaft 39 arranged parallel with and in front of the shaft 35 and journaled at its opposite ends within the arms 27. Carried on the end of the shaft 39 opposite from the sprocket 38 is a sprocket 40 which is connected by means of an endless chain connection 41 to a sprocket 42 suitably secured to the gathering member 30. It will thus be obvious that when the bevel gear 11 is connected by means of the clutch 14, 15 to the sleeve 17 the gathering roll 30 and the conveyor 4 may be simultaneously actuated. Improved means are provided for raising and lowering the gathering member and such means comprises a clutch housing member 43 secured as by a set screw to the shaft 13, and this housing member carries therein a series of friction clutch disks 44 which are interleaved with a corresponding series of clutch disks 45 carried by a clutch member 46 threadedly connected to a sleeve 47 surrounding the shaft 13 and suitably journaled thereon. As clearly shown in Fig. 3, the sleeve 47 has secured thereto at its outer end as by a key 48 a spur pinion 49 which meshes with a larger spur gear 50 threadedly connected to the hub of a chain drive sprocket 51 rotatably mounted on the shaft 22. The chain sprocket 51 is connected by means of an endless chain connection 52 to a chain sprocket 53 secured to a horizontal shaft 54 extending transversely of the machine and disposed parallel with and in the rear of the shaft 35. The shaft 54 has secured thereto at its opposite ends spur pinions 55 which mesh with arcuate toothed members or gear segments 56 suitably rigidly secured to the inner sides of the parallel supporting arms 24. From the foregoing it will be seen that when the sleeve 47 is connected to the shaft 13 by means of the clutch 44, 45, the pinions 55 are rotated consequently moving the gear segments 56 and the arms 24 upwardly or downwardly at will, the arms 24 swinging about their pivots 25 at that time. As clearly shown in Fig. 1, formed on the outer ends of the arms 24 are gear teeth 57 with which pawls or dogs 58 are adapted to cooperate, the dogs 58 being pivotally mounted on the arms 27. As illustrated, the arms 27 have formed thereon projecting stop members or abutments 59 which are adapted to engage cooperating stops or abutments 60 formed on the forward end of the frame 1, in a manner to be hereinafter fully described.

In operation the machine is advanced by its endless tracklaying treads 2 toward a pile of loose material, as for instance coal which is to be conveyed upwardly onto the conveyor. As the machine is fed forwardly, the arms 24 and 27 and the gathering roll 30 are in their elevated position as indicated by dotted lines in Fig. 1, downward movement of the arms 27 and the gathering member 30 relative to the arms 24 being prevented by means of the dogs 58 engaging the teeth 57 on the arms 24. When the forward edge of the conveyor has reached and penetrated the material to be loaded and further forward movement of the loading machine is stopped, the clutch 44, 45 is released and the arms 24, 27 and the gathering roll 30 are moved downwardly under their own weight by gravity. During the swinging movement it is to be understood that the clutch 14, 15 is applied and the conveyor 4 and the rotary member 30 are driven. As the gathering mechanism engages the loose material the rotary gathering member 30 will first engage and sweep the material downwardly and rearwardly toward the forward end of the conveyor 4, the rotary member 30 moving downwardly by gravity until it assumes the full line position shown in Fig. 1. The clutch 44, 45, is then applied, effecting rotation of the pinions 55 and consequently swinging the gear segments 56 and the arms 24 upwardly. During the initial swinging movement of the arms 24 the dogs or pawls 58 fall away from the teeth 57 and so the weight of the rotary member 30 causes the arms 27 to swing inwardly by gravity, consequently drawing the toothed roller along the bottom and moving the coal up to the forward end of the conveyor until the intermediate dotted line position shown in Fig. 1 is reached, the stops 59 engaging the relatively fixed stops 60 at that time, thereby preventing further movement of the roll and contact of the teeth 31 with the conveyor parts. Upon further swinging movement of the arms 27 the stop members 59 move over the relatively stationary stop members 60, consequently causing the arms 27 to be swung out and upwardly from the intermediate dotted line position shown in Fig. 1 to the upper dotted line position shown in that figure, the dogs 58 again engaging the teeth 57 at that time, thereby maintaining the arms 24 and 27 in substantially rigid relation. After the gathering mechanism assumes this latter position, the loading machine is then advanced bodily toward the pile of loose material and the cycle of operation heretofore described is repeated.

As a result of this improved gathering mechanism it will be noted that it is possible to sweep the coal down from the pile and draw it along the bottom rearwardly and up to the conveyor far enough in advance of the machine to enable the loading machine to move forwardly a comparatively great distance at each cycle of operation, this distance being sufficient in many instances to obtain a mine carload of coal and consequently giving materially greater production with less manipulation of the loader. These and other advantages of this improved loading machine will be clearly apparent to those skilled in this art.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a rotary material gathering element, spaced parallel arms supporting said element, a second pair of spaced parallel arms pivotally connected to said first mentioned arms at a point spaced from the axis of rotation of said rotary gathering element, a pivotal support for the second pair of arms about which the same may be moved to raise and lower the pivotal connection between the arms, means for effecting pivotal movement of the second pair of arms, means automatically operative on raising of the point of pivotal connection between the arms to a predetermined position to swing the first mentioned arms in a path to move the rotary gathering element away from the pivotal support for the second mentioned arms and for locking the pairs of arms against relative swinging movement in an opposite direction, said locking means being operative automatically to release the arms for relative angular movement in a lowered position thereof.

2. In combination, a gathering element, and supporting means therefor including a plurality of pivotally connected devices one of which is pivotally supported for movement about an axis spaced from the pivotal connection between said devices, means for moving said last mentioned device about its pivot under power, and means operative automatically on predetermined movement of said last mentioned device to swing the other of said devices automatically upwardly about the pivotal connection between the devices.

3. The combination with loading mechanism comprising a body and a conveyor thereon having a material receiving end, of means for feeding material on to the receiving end comprising a rotary gathering device, supporting arms therefor, members to which said supporting arms are pivotally connected, means for moving said members to raise and lower the point of pivotal connection between said members and said supporting arms, and means for automatically swinging said supporting arms upwardly about said pivot upon predetermined upward movement of said pivot.

4. The combination with loading mechanism comprising a body and a conveyor thereon having a material receiving end, of means for feeding material toward said end comprising a pair of parallel arms pivoted on said body, a pair of cooperating parallel arms pivoted to the outer ends of said arms, means carried by said arms respectively for locking the same together, and a rotary gathering member carried at the outer end of said second mentioned arms, said locking means being automatically releasable on predetermined relative movement between said arms to free the last mentioned arms for movement relative to said first mentioned arms to move said gathering member towards said receiving end.

5. The combination with loading mechanism comprising a body and a conveyor thereon having a material receiving end, of means for feeding material toward said end comprising parallel arms pivoted at their inner ends on said body, a pair of cooperating parallel arms pivoted at the outer end of said arms, a rotary gathering member carried at the outer end of said second mentioned arms, means for locking said arms together for simultaneous movement comprising teeth formed on one arm and a cooperating pivoted dog carried by the other arm, power operated means for swinging said arms upwardly, said locking means being automatically released on predetermined relative movement between said arms to permit swinging movement of said last mentioned arms relative to said first mentioned arms.

In testimony whereof I affix my signature.

WADE H. WINEMAN.